US006298439B1

United States Patent
Beglin

(10) Patent No.: US 6,298,439 B1
(45) Date of Patent: Oct. 2, 2001

(54) AUTOMATED STORAGE LIBRARY FOR MANAGING ALLOCATION OF A PERIPHERAL DATA STORAGE DEVICE IN RESPONSE TO A MULTI-VOLUME DATA SET REQUEST

(75) Inventor: Thomas William Beglin, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/188,001

(22) Filed: Jan. 28, 1994

(51) Int. Cl.$^7$ ........................................ G06F 9/00
(52) U.S. Cl. ........................ 713/1; 709/100; 711/111
(58) Field of Search ...................... 395/650, 700, 395/835, 837, 838, 438; 364/285, 285.1, 478.03

(56) References Cited

U.S. PATENT DOCUMENTS

| | | | |
|---|---|---|---|
| 4,399,936 | 8/1983 | Rueger | 226/92 |
| 4,435,762 | 3/1984 | Milligan et al. | 364/200 |
| 4,771,375 | * 9/1988 | Beglin et al. | 364/200 |
| 4,864,438 | 9/1989 | Munro | 360/92 |
| 4,945,428 | 7/1990 | Waldo | 360/92 |
| 4,974,156 | 11/1990 | Harding et al. | 364/200 |
| 5,018,060 | * 5/1991 | Gelb et al. | 364/200 |
| 5,025,431 | 6/1991 | Naito | 369/36 |
| 5,121,483 | 6/1992 | Monahan et al. | 395/275 |
| 5,164,909 | * 11/1992 | Leonhardt et al. | 364/478 |
| 5,185,727 | 2/1993 | Blakeway et al. | 369/34 |
| 5,197,055 | 3/1993 | Hartung et al. | 369/34 |
| 5,287,459 | * 2/1994 | Gniewek | 395/275 |

OTHER PUBLICATIONS

K. E. Duvall and D. T. Fisher, "Asynchronous Allocation Requests", IBM Technical Disclosure Bulletin, vol. 25, No. 8, Jan. 1983, pp. 4148–4150.

* cited by examiner

Primary Examiner—Dennis M. Butler
(74) Attorney, Agent, or Firm—Dan Hubert & Assoc.

(57) ABSTRACT

A method and system for managing a multi-volume data set request in an automated storage library. The library includes automatic means for prioritizing and selecting the optimum peripheral data storage device (PDSD) for mounting a data volume belonging to the requested multi-volume data set. The optimum PDSD is that one PDSD having the closest proximity to all volumes of a multi-volume data set. The automatic means include means for determining the location of each data volume in the requested multi-volume set and means for comparing the location of each volume to the location of peripheral data storage devices. The library system employs a weighted score based on the proximity of each PDSD to each volume in a multi-volume data set to prioritize and select the optimum PDSD when a multi-volume data set is requested. Each PDSD subsystem may include one or more PDSDs.

17 Claims, 5 Drawing Sheets

AUTOMATED STORAGE LIBRARY FOR MANAGING ALLOCATION OF A PERIPHERAL DATA STORAGE DEVICE IN RESPONSE TO A MULTI-VOLUME DATA SET REQUEST

DOCUMENTS INCORPORATED BY REFERENCE

The following documents are incorporated by reference into this patent application:

U.S. Pat. No. 4,974,156, issued on Nov. 27, 1990, and assigned to the assignee of the present invention;

U.S. Pat. No. 4,945,428, issued on Jul. 31, 1990, and assigned to the assignee of the present invention;

U.S. Pat. No. 4,435,762, issued on Mar. 6, 1984, and assigned to the assignee of the present invention; and U.S. Pat. No. 4,399,936, issued on Aug. 23, 1983, and assigned to the assignee of the present invention.

BACKGROUND OF THE INVENTION

1. Field of the Invention

This invention relates generally to a machine executed method and a system for managing a multi-volume data set request in an automated storage data library. More particularly, the method and system allow for an efficient selection of an optimum peripheral data storage device candidate from among plurality of peripheral data storage devices in response to a request for access to a plurality of data volumes.

2. Description of the Related Art

Modem computer systems require large quantities of storage capacity. To meet this requirement computer memory is available in many forms. A fast, but expensive, form of memory is main memory, typically in the form of micro chips. Other available forms of memory, known as peripheral data storage devices (PDSDs), include magnetic direct access storage devices (DASD), magnetic tape storage devices, and optical recording devices. Each of these other types of memory has a greater storage density and lower cost than main memory. However, these other memory types require mechanical movement to access stored data and therefore exhibit slower access times than purely electronic main memory.

Storing all data in a computer system in main memory is too costly; but, storing all data on one peripheral storage device reduces performance. Thus, a typical computer system includes both main memory and one or more types of PDSDs arranged in a data storage hierarchy. In such a hierarchy, main memory is often referred to as the primary data storage. The next level of a hierarchy is known as the secondary data storage, and so on. Generally, the highest level of the hierarchy has the lowest storage density capability, the highest performance, and highest cost. As one proceeds down through the hierarchy, storage density generally increases, performance generally decreases, and associated costs generally also decrease. By transferring data between different levels of the hierarchy, as required, the cost of memory is minimized and performance is maximized. Data is thus stored in main memory only so long as it expected to be required by the processor.

Therefore, in order to have the required information available on an "as needed" basis, much storage at the lowest level of the hierarchy is required. Many business applications, for example, require numerous disks or tapes to meet the lowest level storage needs. Automated storage libraries have been developed to manage the storage of and provide efficient access to such disks or tapes.

Automated storage libraries include a plurality of storage bins or slots for retaining data storage media, such as magnetic tapes, magnetic disks, or optical disks, and also have a robotic picker mechanism, and one or more PDSDs. Each data storage medium may be contained in a cassette or cartridge housing for easier handling by the picker. The picker operates on command to transfer the storage media between the storage bins and the PDSDs without manual assistance. A PDSD having a storage medium mounted therein is referred to as "unavailable". Conversely, a PDSD without a storage medium mounted therein is referred to as "available". Once a data storage medium is mounted in a PDSD, data may be written to or read out from that medium for as long as the system so requires. Data is stored in secondary data storage in the form of one or more files, each file being a logical data set.

It is not uncommon for a large data set to span several hundred cartridges or cassettes in the case where the storage medium is tape. When the storage medium is a computer disk it is not uncommon for a data set to span more than one disk or more than one disk side. Each side of a cartridge, cassette or disk is considered a "volume". Data stored on one side comprises a "data volume". When a data set covers more than one side of a cassette or disk it is said to be a "multi-volume data set".

When a multi-volume data set is requested, the actual volumes containing the entire data set are likely to be dispersed in a plurality of storage bins located throughout the library. Due to the disperse locations of each volume in a multi-volume data set, selecting the optimum peripheral storage device or drive to transfer the data set to PDSDs greatly increases data access time and therefore decreases computer performance and efficiency.

Several automated storage libraries are known. IBM Corporation introduced the 3850 mass storage subsystem for retrieval of magnetic tape modules in the 1970s. More recently, several automated storage libraries for magnetic tape cartridges and optical disks have been introduced. Examples of an automated storage and retrieval system, employing an automated tape cartridge library can be found in U.S. Pat. Nos. 4,864,511 and 4,864,438. Examples of optical disk libraries can be found in U.S. Pat. Nos. 4,974, 156 and 4,945,428. Also systems for general automated libraries capable of handling either tapes or optical disks are described in U.S. Pat. Nos. 5,121,483 and 5,197,055. The robotic picker mechanisms of these libraries include one or more grippers. Each gripper is capable of handling one data storage medium at a time. IBM Corporation also provides the 9246 Optical Library Unit including a two-gripper picker.

The efficient operation of pickers and grippers greatly increases the overall efficiency of an automated storage library. The selection of storage media for transfer between storage bins and PDSDs, the time of the transfers, and the selection of the location to be transferred to are among the factors which determine data access time.

U.S. Pat. No. 4,864,438 describes an apparatus for managing movement of tape cartridges in an automated tape cartridge library system. In the apparatus, each tape cartridge stored in the library system is identified and its physical location is determined, whether in its home position or in transit. The apparatus includes a path selection apparatus to manage the movement of the tape cartridges between home (storage) positions and mounting positions in designated PDSDs. In this regard, a path between two end points is selected, and the apparatus is reserved to transport the designated tape cartridges between these two end points. Provision is made for maintaining the apparatus reservations until the movement of the tape cartridge is completed. In this fashion, if the movement of the tape cartridge is blocked somewhere along the path, the apparatus remains reserved to return the designated cartridge back to its original or home position.

Careful selection of a mounting location might lessen the reservation load on the management apparatus because it would reduce the likelihood of the path being blocked. Specifically, if the cartridges were mounted on the nearest available drive then cartridge picker travel distances would be decreased. If cartridge pickers do not travel any farther than a minimum required distance then the likelihood of the travel path of one picker being blocked by another picker is decreased.

U.S. Pat. No. 4,864,511 discloses a storage and retrieval subsystem employing an automated tape cartridge library having a split controller architecture that permits the library management controller to operate transparently to a host computer, thereby eliminating the host computer overhead associated with picker control. The patent does not disclose how to select an optimum mounting location for mounting a storage medium.

Although the selection of a mounting location for a data volume is clearly critical, none of the other above mentioned U.S. patents discloses a method, apparatus, or system to prioritize and subsequently select the optimum mounting location to transfer the data storage medium containing a requested data volume.

A trend in automated library systems is to increase the amount of peripheral storage devices, such as drives. If the amount of drives is increased then there is an increased likelihood of not selecting a drive which is optimum with respect to the distance between itself and each volume of a multi-volume data set.

Another trend is to add redundant hardware to automated data library systems as part of a fail safe strategy and to increase performance. Such redundant hardware may include multiple robotic data storage medium pickers. However, when multiple robotic data storage medium pickers are available, the management of these pickers becomes critical. Managing the motion of two pickers, both of which travel on a common rail system, is not a simple task. If both pickers have to travel the entire length (or most of the length) of the rail simultaneously to process volume mount and demount requests, managing their movements to prevent their interfering with each other is difficult. If the travel paths of the two pickers begin to interfere with each other, such that one picker must wait for the second to move out of its current travel path, then reduced levels of performance can be expected because one picker will be idle waiting for the second to move out of the way. One would like to minimize the overlap of the travel path of the two pickers during normal operations. Accordingly, a method and system for minimizing the overlap and travel of the two pickers in an automated storage library is needed.

SUMMARY OF THE INVENTION

In view of the foregoing, the principal object of this invention is to provide an improved method and system for managing access to data volumes in an automated storage library.

Yet another object of this invention is to provide a method and system for determining the optimum peripheral data storage device for mounting a data volume when a multi-volume data set is requested in an automated storage library.

Still another object of this invention is to provide a system and method for selecting the optimum peripheral data storage device for mounting a data volume when a multi-volume data set is requested, thereby minimizing the travel and overlap of robotic medium pickers.

In accordance with the foregoing objectives an improved automated library system is disclosed. The library includes means for selecting the optimum peripheral storage device of a plurality of peripheral storage devices for mounting the data volume when a multi-volume data set is requested.

The invention determines the location of each data volume in the requested multi-volume set and compares the location of each volume to the location of peripheral data storage devices. Further the invention prioritizes and selects an optimum peripheral data storage device based on an assigned weighted score which is determined according to the proximity of one or more peripheral data storage devices to each data volume in a multi-volume set.

It is an advantage of this invention that the assigned weighted score is based on each data volume in a multi-volume data set, rather than simply the first volume in a multi-volume data set. The advantage ensures that an optimum peripheral data storage device will be selected even if the first data volume in the multi-volume data set is located far from the other volumes in the data set.

The foregoing, together with other objects, features and advantages of this invention, will become more apparent when referring to the following specification, claims and the accompanying drawings.

BRIEF DESCRIPTION OF THE DRAWING

The objects, advantages and features of the present invention will be more clearly understood by reference to the following detailed disclosure and the accompanying drawing in which.

DETAILED DESCRIPTION OF THE PREFERRED EMBODIMENTS

Figure 1:
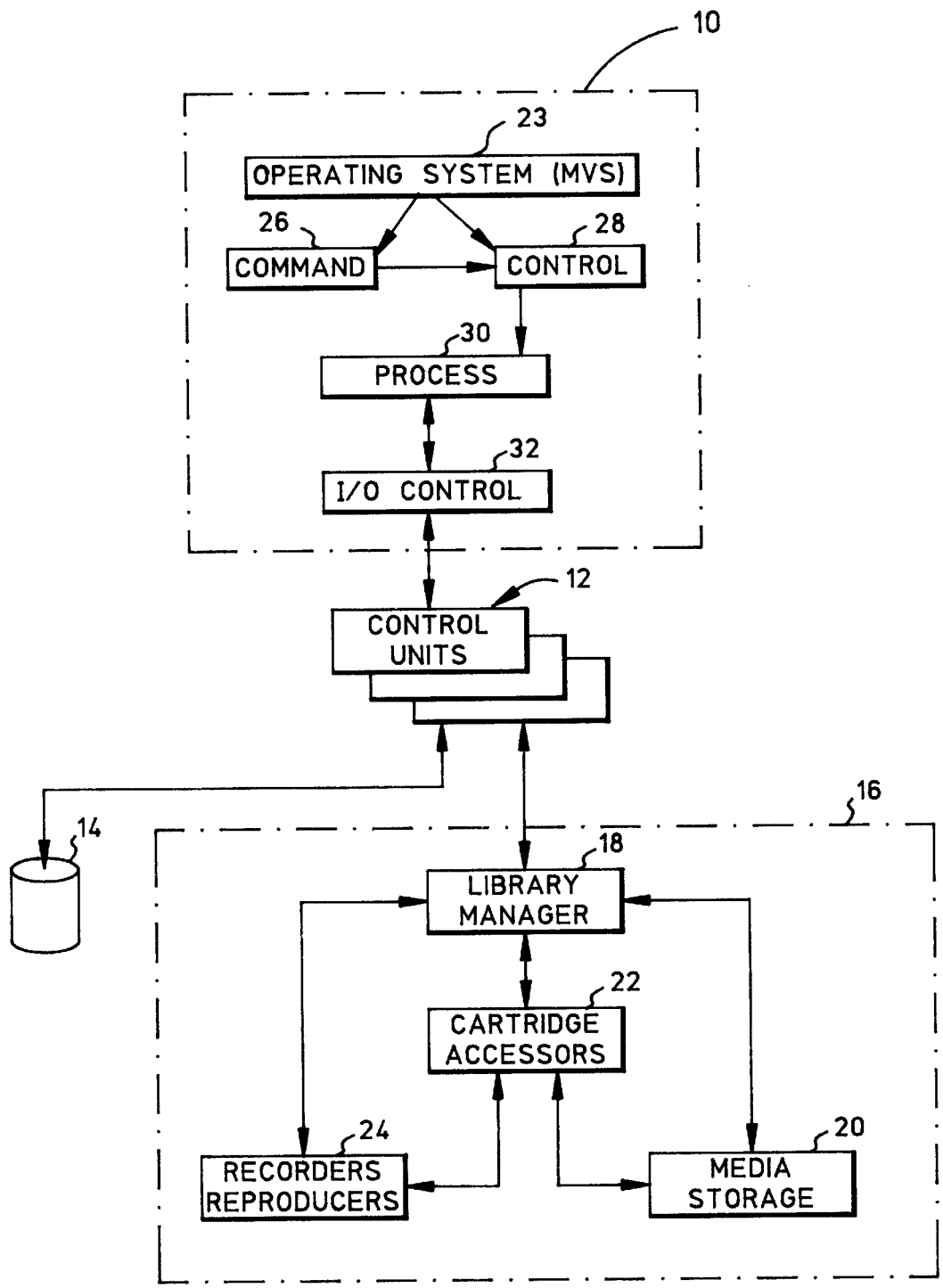
FIG. 1 is a simplified block diagram of a data processing environment which includes a data storage hierarchy useful with the present invention.

A data processing environment, as shown in FIG. 1, includes a host processor 10 having a set of peripheral subsystems, some of which include comprised of one or more peripheral data storage devices (PDSDs) 14 . A plurality of control units 12 are used to access one or more PDSDs 14 . The PSD 14 represents a lower level of a data storage hierarchy, which may include a plurality of PDSD units.

Another peripheral subsystem includes at least one automated storage "library" 16, which is adapted to receive removable media. The library 16 is one that uses sequentially recorded data on transportable media, which may include magnetic tapes, magnetic disks, and optical disks. The library 16 may be an automated library of known design. Such a library may include the IBM 3495 Tape Library Dataserver which has tape cartridges mountable on recorders/reproducers for providing data communication between the volumes of data stored in each cartridge and the control units 12. The media library system may also be an optical disk library as discussed above.

The host processor 10 includes logic for computation and data processing system control. Such logic may include a program such as the IBM program product called Data Facility/Hierarchical Storage Manager (DFHSM) which provides for migration and backup of data storage from a primary level of peripheral devices to a secondary level. The secondary level includes the media storage units 20 shown in FIG. 1. The DFHSM program product is executed in, for example, an IBM 3090 system; it sends messages to the media library 16 for the retrieval of the data from media units stored in the media storage units 20.

A "library manager" 18 includes a processor containing program code for controlling the retrieval of data in the library 16. The library manager 18 manages the operation of one or more media storage units 20, the accessing of cartridges by one or more cartridge accessor units 22, and the reading and writing onto the media in one or more recorder/reproducer units 24, all included as part of the library 16. The control of the library 16 is provided by the library manager 18.

Figure 2:
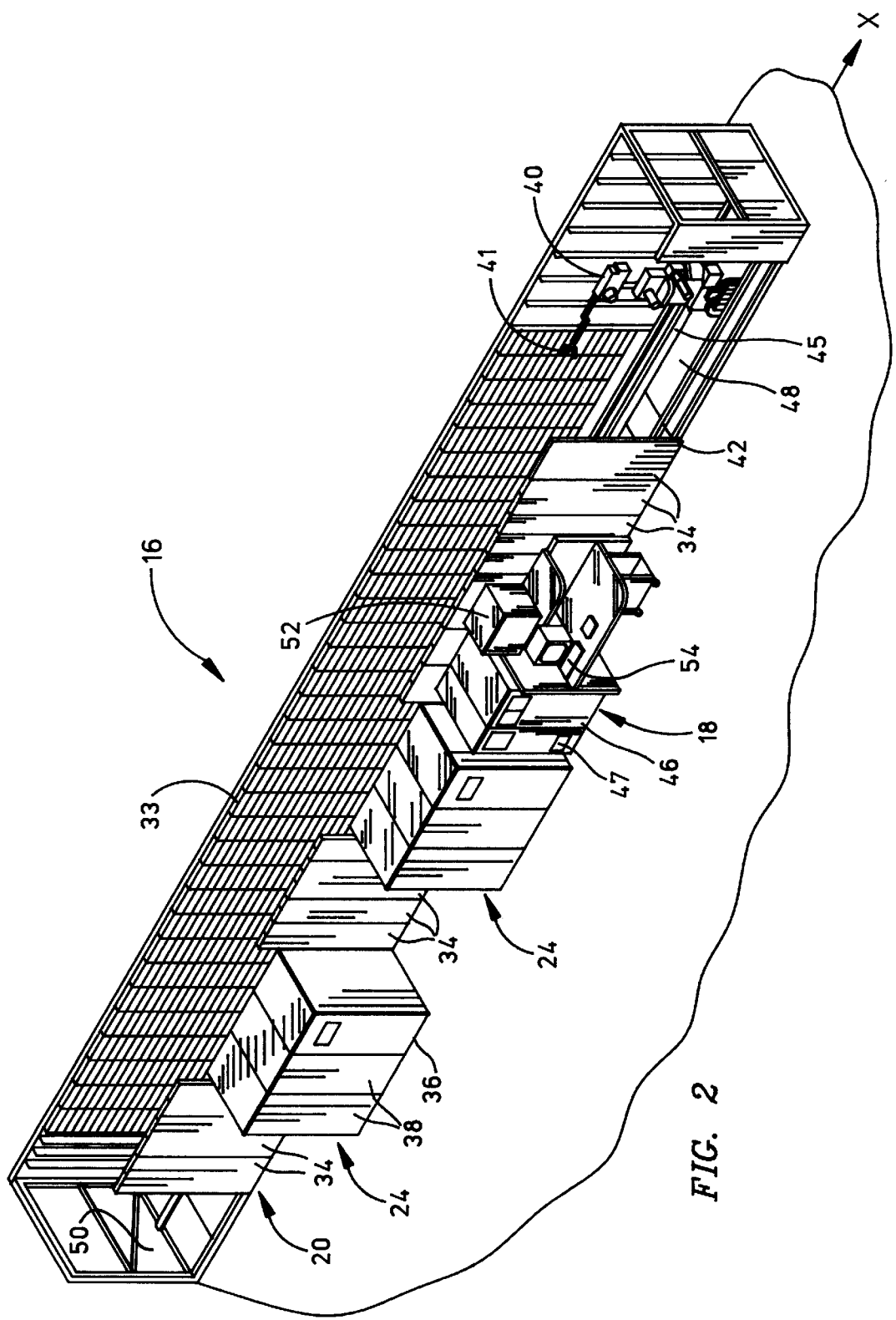
FIG. 2 is a perspective view of an automated library storage subsystem useful with the hierarchy FIG. 1.

Referring to FIGS. 1 and 2, in a preferred embodiment, the library manager 18 is an IBM PS/2 personal computer 54 running OS/2 with special application program code loaded in random access memory. The library manager 18 is generally responsible for the duties of controlling the one or more cartridge accessor units 22, providing service interfaces, and communicating with the host operating system 23.

Referring, once more, to FIGS. 1 and 2, automated storage libraries, such as library 16, improve the access time to the information stored on the media units contained therein by automatically managing the storage of the data onto the media units through the library manager 18. The library 16 includes a plurality of storage bins 33 (shown in FIG. 2) placed in the media storage unit 20 for storing the resident storage medium. The library 16 further includes the cartridge access units 22, each including a robotic picker mechanism ("robot") 40. Each robot 40 is controlled by the library manager 18 to retrieve and to store the media units from media storage unit 20. Each storage bin 33 includes a tape or disk media contained in a casing, such as a cassette or cartridge housed for easy handling by the robot. A robot 40 operates on command to transfer a data storage media unit between the media storage unit 20 and the recorders/reproducers 24.

A command module 26 in the host processor 10 includes a program task which receives software commands from other programs, such as the DFHSM program, in the host processor 10. Such commands are decoded and transferred to a control task module 28. The control task module 28 includes the logic for determining when data is to be retrieved from the media library 16. The data to be retrieved is processed in a process module 30 and directed out to an I/O control module 32 to the control unit 12. The control unit 12, in turn, passes the request to the media library 16. The library manager 18 of the library 16 uses the request to determine the control of media and the cartridge accessor 22, according to the present invention.

FIG. 2 shows an automated form of a cartridge library which represents the library 16 of FIG. 1. It should be evident that many different types of media may be stored in the library 16, such as spiral recorded optical disks and magnetic disks, as well as magnetic tapes stored in any type of casing, such as cassettes or cartridges. In the embodiment, as shown in FIG. 2, individual spools of magnetic tape are housed in plastic cartridges for protecting the magnetic tape and providing a convenient handling mechanism for the automated retrieval of the cartridges. Such plastic cartridges are well known in the art.

Figure 4:
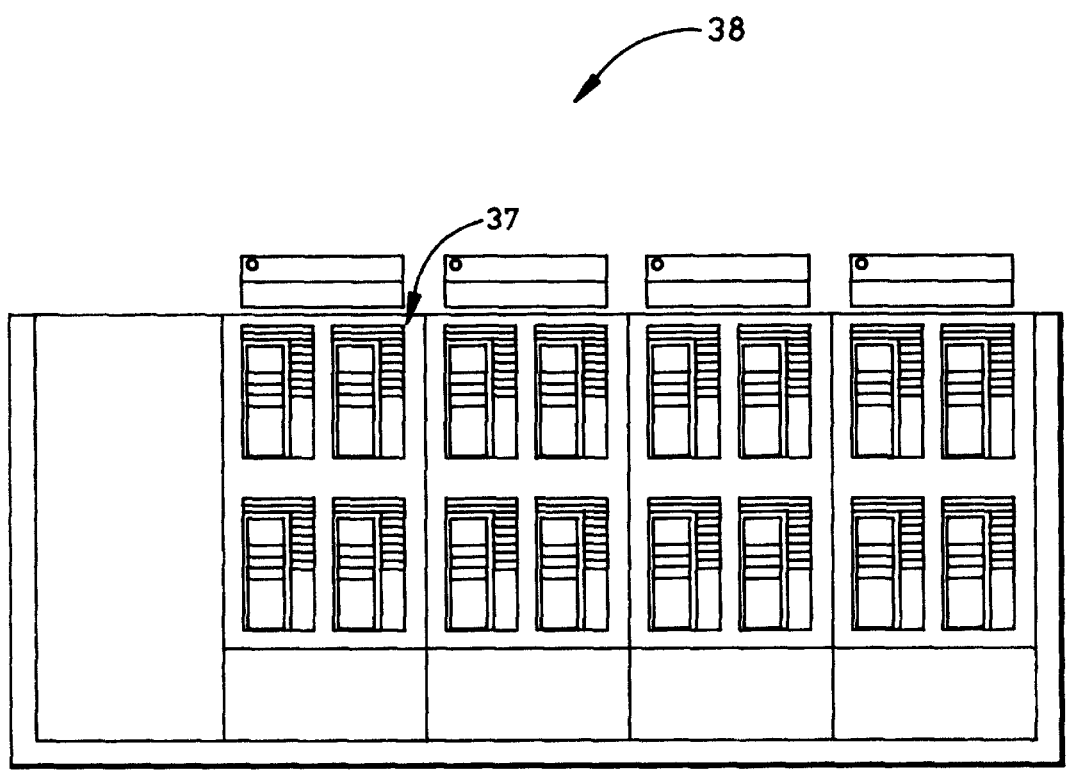
FIG. 4 is a front view of a tape drive subsystem containing at least one tape drive useful with the present invention.

Referring to FIGS. 2 and 4, the library 16 of FIG. 2 includes the media storage unit 20, shown as a plurality of modules 34 each having a plurality of magazine holders (not shown). Each magazine holder in a module 34 includes a plurality of storage bins 33, each storage bin 33 storing a magnetic tape cartridge therein. The library 16 also includes one or more recorder/reproducer units 24, each of which may be, for example, an IBM 3490 magnetic tape system having a tape controller 36 and a tape subsystem 38 containing at least one tape drive 37 (shown in FIG. 4). An example of a tape drive usable as the tape drive 37 is shown in the incorporated '936 patent. Operation of the controller 36 and the tape drive 37 are discussed in the incorporated '762 patent.

In the library 16 of FIG. 2, each cartridge accessor 22 of FIG. 1 includes a robot 40, having a gripper assembly 41 attached thereto, which travels on an outrigger rail 42 and a guide rail 45 to transfer tape cartridges between the storage bins 33 and the tape drives 38. A robot controller 46 and a library controller 47, both part of the library manager 18 of FIG. 1, controls the commands directed to the robot 40 and the operation of the recorders/reproducers 24. A service bay 48 for the robot 40 is located at one end of the cartridge library 16. The service bay 48 functions as a parking space for the robot 40 when not in use or when it is being serviced. An operator access bay 50 is provided at the other end of the cartridge library 16 to allow service personnel to enter the system. A remote terminal bay 52, accessible internally by the service personnel, is attached to the cartridge library 16.

Library management and control of the library manager 18 of FIG. 1 are available to an operator through computer 54. The library manager 18, through the computer 54, permits an operator to determine system status, promote a tape cartridge status and, generally, enter external instructions into the cartridge library system 16. The library manager 18 instructs the robot 40 to identify the tape cartridges and to move them to a tape drive 37 for either writing data information onto tape or retrieving the data already stored on tape under control of the library manager 18. The library 16 includes the media storage unit 20, the modules 34 and the storage bins 33, the cartridge accessors 22, the robot 40, and the recorders/reproducers 24, the tape controller 36, the tape subsystem 38, and the tape drive 37.

When a multi-volume data request is made in the current IBM 3495 system the operating system 23 (such as an MVS operating system, hereinafter "MVS") stored in host processor 10 is responsible for allocating the resources (tape drives, tape volumes, and the data set for the request). An MVS common allocation calls a service to select eligible device names. The service's function is to return a list of device names to MVS for use in allocating the requested number of tape drives to the current allocation request.

Referring to FIG. 4, the tape subsystem 38 is a grouping of at least one tape drive 37, for mounting a requested data volume. Although a tape subsystem, such as the tape subsystem 38, typically has more than one tape drive, it will be readily apparent to those skilled in the art that the present invention described herein would equally apply to a subsystem consisting of only one tape drive. Subsystems are generally identified to MVS by an application program employing an addressing scheme which involves creating device peripheral data storage device (PDSD) pools. PDSD pools are generally used to refer to any grouping of PDSDs and are not limited to tape subsystems such as the subsystem 38. Without the improvement of the present invention, the PDSD pool list is ordered in a fashion which only takes into consideration the physical proximity of each tape subsystem such as subsystem 38 with respect to the first tape volume in the multi-volume data set. Because of this, MVS allocation, without the improvement of the present invention, may take the tape drive, such as the tape drive 37, from the subsystem, such as the subsystem 38, that is closest to the first tape volume of the multi-volume data set, but this selected tape drive may be the one that is the farthest away from the remaining tape volumes in the set.

In order to more clearly understand the present invention a description of PDSD pool creation will now be given. Each IBM 3490 or 3490E magnetic tape subsystem, in an IBM 3495 tape library dataserver, is assigned a 1-byte numerical identifier from 1 to n, where n represents the number of 3490/3490E tape subsystems within the 3495 tape library. The PDSD pool names are automatically generated by the MVS operating system. The PDSD pool names are a combination of:

1. The five digit serial number assigned to the IBM 3495 automated tape library;
2. The numerical identifier assigned to the IBM 3490/3490E magnetic tape subsystem within the 3495 automated tape library; and
3. The character "A".

As an example, PDSD pool name 1234502A represents all of the IBM 3490 tape drives in the second ("02") magnetic tape subsystem in the IBM 3495 tape library dataserver having a serial number of "12345". Such a creation of PDSD pools is known in the art.

Figure 3:
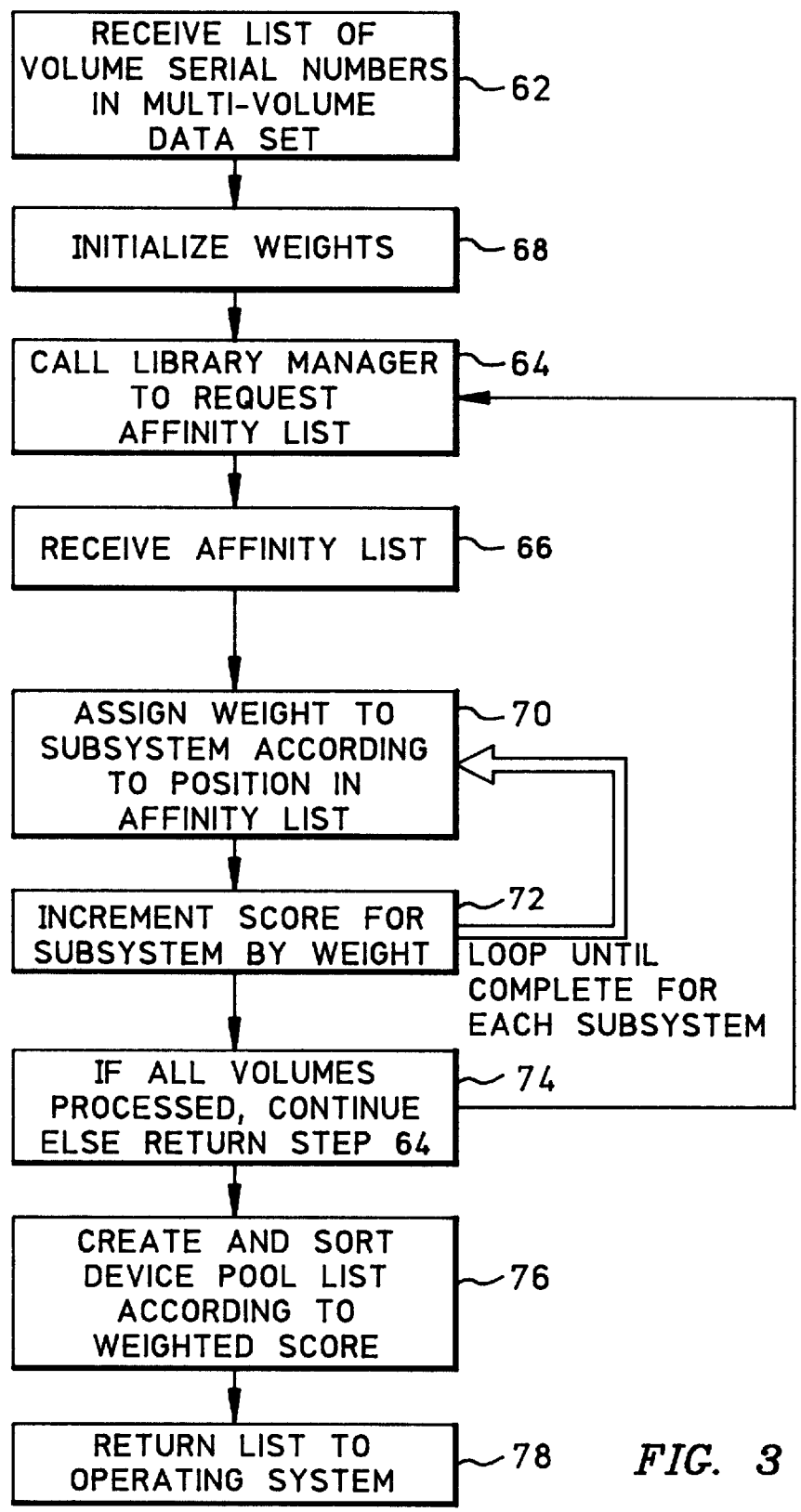
FIG. 3 is a flow diagram illustrating how the invention selects an optimum peripheral storage device.

FIG. 3 shows a flow diagram illustrating selection of an optimum PDSD in the automated library 16 employing the present invention. In the present invention, when the MVS in host processor 10 attempts to allocate the tape drive subsystem, such as the subsystem 38, for a specific multi-volume request it must pass the volume serial number for each volume in the requested data set to the command module 26 (shown in FIG. 1). Thus, the volume serial numbers serve to identify each volume. The volume serial numbers of the tape volumes on which the data set resides may be coded on the data definition statement in a job control language. Alternatively, the tape data set may be catalogued in the system catalog. The volume serial numbers are used to identify whether the volume is located in storage or is currently mounted as disclosed in the incorporated '156 patent. The location of the volume and the location coordinates of the PDSD 14 is therefore available to be used by the system.

The command module 26 attempts to build an ordered list of eligible peripheral data storage device pools to return to MVS allocation. When selecting a tape drive such as tape drive 37 from a PDSD pool, MVS allocation must select only from the peripheral data storage devices that are currently available (i.e. online and not currently allocated). In order to build an ordered list of eligible PDSD pools the command module 26 asks the library manager 18 to give it a subsystem affinity list as shown in step 64.

The command module 26 asks for a subsystem affinity list by performing a perform library function channel command word containing a Prepare to Read Subsystem Data order asking for Volume Data, followed by a Read Subsystem Data channel command word. The command module 26 passes to the library manager 18 the volume serial number of the first volume in the list. The library manager 18 returns a subsystem affinity list, containing 32 one-byte identifiers. The 32 one-byte identifiers represent the 3490/3490E subsystems in the 3495 tape library that are closest in physical proximity to the volume serial number specified. This step is performed in the usual manner as is known in the art.

However, without the present invention, the first subsystem in the subsystem affinity list is the subsystem, such as the subsystem 38, that is physically closest to the specified tape volume. The second subsystem in the subsystem affinity list is the next closest (based on physical proximity) to the specified volume and so on. The command module 26 uses the subsystem affinity list to order the device pools returned to MVS allocation, such that the PDSD pool representing the tape subsystem, such as the subsystem 38, that is closest to the tape volume in the list is first in the PDSD pool list, the PDSD pool representing the tape subsystem that is next closest to the first tape volume in the list is next in the device pool list and so on.

Thus, without the improvement of the present invention, when the command module 26 asks the library manager 18 for the subsystem affinity list it only asks for the first tape volume in the list. This is the crux of the problem solved by the invention. The ordering of the PDSD pool list, returned to MVS allocation, only takes into account the physical proximity of the tape subsystems, such as the subsystem 38, with respect to the first tape volume in the list. For a specific multi-volume request the physical proximity of the tape subsystems with respect to the remaining tape volumes in the multi-volume data set is not considered. Because of this, without the improvement of the present invention, MVS allocation may pick the drive, such as the drive 37, from the tape subsystem that is closest to the first tape volume in the multi-volume set, but the tape drive selected may be the one that is farthest away from the remaining tape volumes. Because the remaining tape volumes aren't considered, the tape drive selected could be the farthest away from the majority of tape volumes in the set. This would result in excessive cartridge accessor 22 motion reducing the performance levels (mount response time) and throughput (maximum tape mounts/demounts per hour) in the automated storage library 16.

In order to solve this problem, the present invention employs the library manager 18, utilizing a method for ordering the device pools with consideration of the physical proximity of each tape subsystem, such as the subsystem 38, with respect to all tape volumes in the list for a specific multi-volume request.

According to the present invention the control task module 28, will retrieve from the library manager 18, the subsystem affinity list for each tape volume in a requested multi-volume data set as shown in step 66 of FIG. 3. The subsystem affinity list is in the form of a one-dimensional array denoted as the affinity array. Each element in the array can be referred to as affinity (k), where k varies from 1 to n and represents the number of subsystems. Thirty-two is a reasonable choice for the number (n) of subsystems, such as the tape subsystem 38, likely to be available, The subsystem identifiers are ordered in the array according to the physical proximity of each subsystem to a specified volume. A particular volume is of interest and thus specified because it is one volume in a requested multi-volume data set.

Proximity may be measured in a number of ways. However, in an automated storage library, such as library 16, the distance measured along one axis may be more significant than others. For example, reference to FIG. 2 shows an axis, called the x axis, extending along a longitudinal axis of guide rail 42. A distance measured from a specified volume, $v_x$, to any subsystem, such as tape subsystem 38, may be specified as dx. Thus for $v_x$ an affinity array consisting of n number of elements can be arranged as follows. Element affinity(1) is a subsystem identifier whose distance to $v_x$ measured along the x axis is the shortest distance, $dx_{min}$, of all n subsystems. Continuing with such an ordering scheme, it can be seen that element affinity(n) is a subsystem having the longest distance, $dx_{max}$, of all n subsystems. Thus, affinity(1) is the first element in the one-dimensional affinity array. Array element affinity(1) contains the subsystem identifier of the tape subsystem closest in proximity to the specified volume. Accordingly, affinity(2) contains the subsystem identifier of the tape subsystem next closest in proximity to the specified volume and so on. For example, where there are thirty two subsystems, the subsystem affinity list for a specified volume will be represented by a one-dimensional array having thirty two elements.

Consider, further, the following illustrative example. A requested multi-volume data set may contain one hundred volumes. A typical automated storage library 16 may contain 32 subsystems. The library manager 18 will compose an affinity list for each volume in the requested multi-volume data set. Thus $v_x$ will represent a particular volume in the multi-volume data set (e.g., $v_1$ represents the first volume in the multi-volume data set, and so on through $v_{100}$ representing the one-hundredth volume in the multi-volume set). The library manager 18 will compose an affinity array for each volume, based on the proximity of each subsystem to the specified volume. For $v_1$, the library manager 18 composes a thirty two element one dimensional affinity array, where each element is an identifier for a subsystem ordered according to physical proximity to $v_1$. In this particular example, the library manager 18 will have to compose one-hundred one-dimensional affinity arrays, each having thirty two elements.

Figure 5:
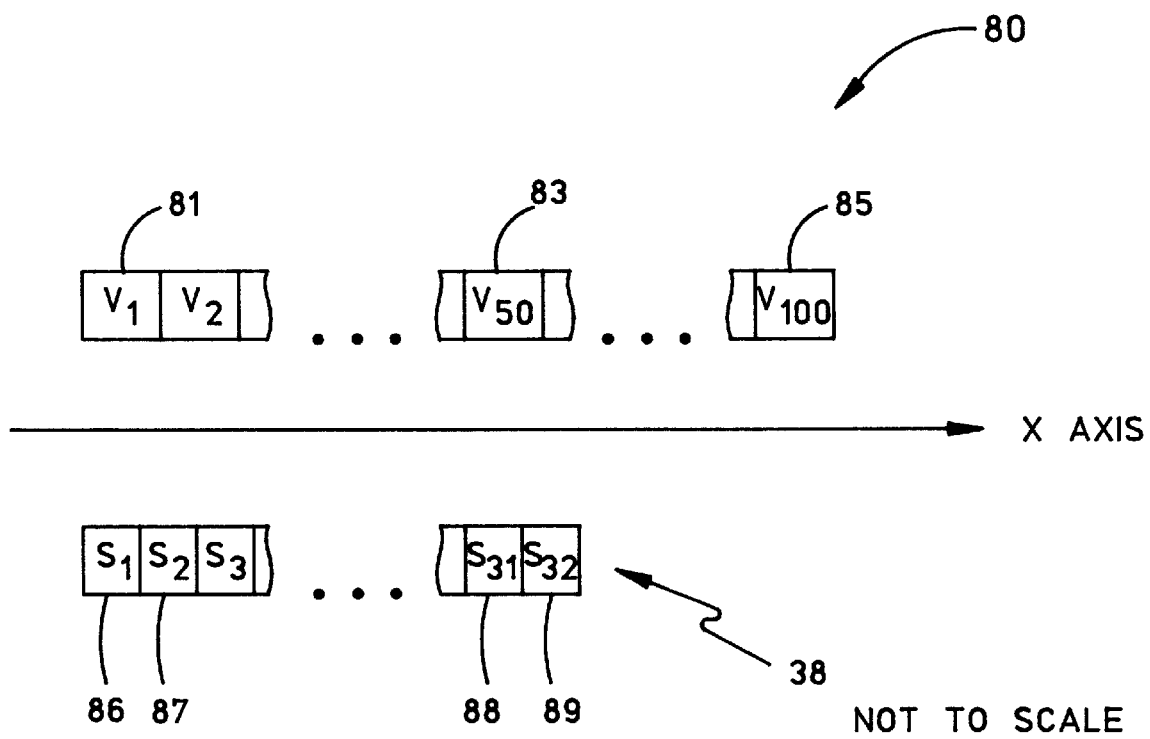
FIG. 5 is a diagram illustrating volume locations relative to peripheral storage devices in an automated storage library useful with the present invention.

Reference to FIGS. 2 and 5 may be made to further illustrate the above example. Volumes 80 are shown spaced relative to subsystems, such as subsystem 38, along a longitudinal axis denoted as the x axis. The x axis represents the travel path of robot 40 along guide rail 42, as shown in FIG. 2. Affinity arrays for $v_1$, 81, $v_{50}$ 83, and $v_{100}$ 85 can be constructed by reference to proximity relationships shown in FIG. 5. Subsystem, 86 is shown having closest proximity to $v_1$ 81, subsystem$_2$ 87 is shown having the next closest proximity and finally subsystem$_{32}$ 89 is shown located the greatest distance away from $v_1$. Thus, the affinity list for $v_1$ will be represented by an affinity array as follows:

affinity(1) = subsystem$_1$ identifier
affinity(2) = subsystem$_2$ identifier
.
.
.
affinity(32) = subsystem$_{32}$ identifier Again, referring to FIG. 5, subsystem$_{32}$ 89 is shown having closest proximity to $v_{50}$ 83, subsystem$_{31}$ 88 is shown having the next closest proximity and finally subsystem$_1$ 86 is shown located the greatest distance away from $v_{50}$. Thus, the affinity list for $v_{50}$ will be represented by an affinity array as follows:

affinity(1) = subsystem$_{32}$ identifier
affinity(2) = subsystem$_{31}$ identifier
.
.
.
affinity(32) = subsystem$_1$ identifier.

Once more referring to FIG. 5, subsystem$_{32}$ 89 is shown having closest proximity to $V_{100}$ 85, subsystem$_{31}$ 88 is shown having the next closest proximity and finally subsystem$_1$ 86 is shown located the greatest distance away from $v_{100}$ 85. Thus, the affinity list for $v_{100}$ will be represented by an affinity array as follows:

affinity(1) = subsystem$_{32}$ identifier
affinity(2) = subsystem$_{31}$ identifier
.
.
.
affinity(32) = subsystem$_1$ identifier.

The actual physical proximity may be measured in a variety of ways. Methods known in the prior art include techniques employed in an IBM System 3495. Proximity in the System 3495 is currently measured in the following general fashion. A database stores the coordinate of each volume, indexed by volume serial number. The longitudinal axis along the guide rail 42 for the robot 40 is used to define a longitudinal coordinate for a specific volume. The longitudinal coordinate is referred to as the x coordinate. Values stored in a database are used to compare the x coordinate of a specified volume to an x coordinate for a tape subsystem to determine proximity. The x coordinate for a tape subsystem is defined at the longitudinal midpoint of the subsystem. The height and depth coordinates are ignored for determining proximity because each is relatively small compared to the distance along the longitudinal axis (typically a guide rail for a robot picker is about 92 feet long, whereas heights vary no greater than 4 feet and depth coordinates do not change).

The command module 26 will initialize a set of weights as shown in step 68 of FIG. 3. The weights are used as part of a scoring system which takes into account the physical proximity of each subsystem to each volume in a requested multi-volume data set. The initial set of weights, is represented by a one-dimensional array. Each element of the weight array can be represented by weight(j), where j varies from 1 to n and represents the number of subsystems. Thirty two is a reasonable choice for the number (n) of subsystems. Generally, the value of each element in the weight array can be determined by the mathematical relationship:

weight(j)=(n+1)−j.

For example, a one-dimensional array of weights in a library containing 32 subsystems would be represented as follows:

weight(1) = 32
weight(2) = 31

-continued weight(3) = 30
.
.
.
weight(31) = 2
weight(32) = 1

A scoring system employing the weights as assigned to each subsystem, such as the subsystem 38, based on its physical proximity to each volume in the data set is tallied by the command module 26 for ordering the device pool list. Each tape subsystem will be assigned a score, represented by the array score(i), where i varies from 1 to n and represents the number of subsystems. Score(1) represents the score for the first tape subsystem, score(2) represents the score for the second tape subsystem and so on. All tape subsystems will start with a score of zero. The score of each subsystem will increase according to the weight assigned to each position in the subsystem affinity list.

If a subsystem appears first in the subsystem affinity list, the score of that subsystem will be incremented by weight (1). If a subsystem appears second in the subsystem affinity list, the score of that subsystem will be incremented by weight(2). If a subsystem appears third in the subsystem affinity list, the score of that subsystem will be incremented by weight(3) and so on.

The score for any given volume, $v_x$, in a multi-volume data set may be calculated by the command module 26 by manipulating array elements. The mathematical relationship:

score(affinity(k))=score(affinity(k))+weight (k), can be exploited to calculate a weighted score for each subsystem based on its proximity to each specified volume, $v_x$, in a requested multi-volume set. In the above equation, k varies from 1 to n and represents the number of subsystems in the automated library 16. Scores are calculated for each subsystem in an iterative fashion from 1 to n times for each specified volume in a requested multi-volume set.

Consider the following example to illustrate the scoring technique employed by the command module 26 in the present invention. Applying the values obtained in the above examples of constructed affinity arrays and a weight array, the following results are obtained. In the case of, $v_1$, applying the values obtained to the general formula above and recalling that each subsystem starts with a score of zero, the first iteration of 1 to n iterations, where n is thirty two, yields:

score(affinity(1))=score(affinity(1))+weight(1)

score(subsystem$_1$)=0+32=32.

The second iteration yields:

score(subsystem$_2$)=0+weight(2)=0+31=31.

Finally, the nth or thirty second iteration yields:

score(subsystem$_{32}$)=0+weight(32)=0+1=1.

The final score for each subsystem will represent the summation of each weighted score calculated for a subsystem based on its proximity to each volume in a requested multi-volume data set. Thus the following mathematical relationship exists:

$$\text{final score (subsystem}_x) = \sum_{i=1}^{Y} \text{score (subsystem}_{xi})$$

In the above equation, Y represents the total number of volumes in a requested multi-volume data set.

Thus, it is necessary to continue the weighted scoring technique for each specified volume to complete the illustrative example. For the purposes of simplifying the example, weighted scores for volumes other than $v_1$, 81, $v_{50}$ 83, $v_{100}$ 85, are ignored. Of course, in a real application the score for each volume must be considered. Continuing with the example yields the following results. In the case of, $v_{50}$, weighted scoring summation yields:

score(affinity(1))=score(affinity(1))+weight(1)

score(subsystem$_{32}$)=1+32=33.

The second iteration yields:

score(subsystem$_{31}$)=2+weight(2)=2+31=33.

Finally, the nth or thirty second iteration yields:

score(subsystem$_{(1)}$)=32+weight(32)=32+1=33.

The summation of scores for all subsystems is complete when the volume limit, Y which equals 100 in this example, is reached. The following results are obtained:

score(subsystem$_{32}$)=33+32=65.

The second iteration yields:

score(subsystem$_{31}$)=33+weight(2)=33+31=64.

Finally, the nth or thirty second iteration yields:

score(subsystem$_1$)=33+weight(32)=33+1=34.

FIG. 3 illustrates how the command module 26 carries out the steps illustrated in the above example. The scores are incremented by the command module 26 for each subsystem, such as subsystem 38, based on its proximity to each volume in the multi-volume data set as shown in step 72 of FIG. 3. Steps 70 and 72 are repeated in a loop fashion until each volume and each subsystem is weighed and the score for each subsystem is incremented. The command module 26 will test to see if all weights are added into the running score for each subsystem as shown in step 74, then a PDSD pool list will be created as shown in step 76.

After tallying the score for each tape subsystem, using the subsystem affinity list for every tape volume in the list, the PDSD pools that are returned to MVS allocation, as shown in step 78, will be ordered such that the tape subsystem with the highest score will be first in the PDSD pool list. The PDSD pool corresponding to the tape subsystem, such as subsystem 38, having the next highest score will be second in the PDSD pool list and so on. In the example from above, recall that score(subsystem$_{32}$)=65, score(subsystem$_{31}$)=64, and score(subsystem,)=33+weight(32)=33+1=34. Thus subsystem$_{32}$ 89 would be first in the PDSD pool list, subsystem$_{31}$ 88 would be next, and finally subsystem$_1$ 86 would be last in the PDSD pool list.

The tape drive, such as drive 37, that is used for mounting each volume of the multi-volume data set will be selected from the subsystem that is represented in the first position of the device pool list. Each volume is mounted sequentially on the one drive selected from within a subsystem. Clearly, since there may be 1 or a plurality of tape drives, such as the drive 37, in a subsystem, such as the subsystem 38, the present invention is useful for selecting the optimum tape drive in an automated storage library 16 when a specific multi-volume data set is requested. Since the invention is applicable to other storage media, the present invention is useful to pick the optimum PDSD 14 in an automated storage library 16 when a specific multi-volume data set is requested.

It may be necessary to consider other criteria for selecting an optimum drive within a subsystem selected from the ordered PDSD list, but by applying the method of and system of the present invention the drive selected will always be within the subsystem having the closest proximity to all volumes in a multi-volume data set as illustrated above. Other criteria considered in the current IBM 3495 system include adherence to the rule that MVS allocation will only allocate an unallocated, i.e. not currently in use device. Such a device is said to be eligible. If there are multiple devices in the list of eligible devices, MVS allocation will pick the device using a preference order that considers things such as whether or not the drive is the correct drive for the media type on which the requested data set is stored.

The method of mounting of each volume on the selected tape drive is not critical to the present invention. However, for the sake of completeness reference may be made to the incorporated '762 patent.

By selecting the optimum tape drive, such as the drive 37, performance levels and throughput of automated storage library 16 will be improved. There will be less cartridge accessors 22 motion required to mount each tape volume required for a specific multi-volume data request. The revised device pool ordering method of the present invention and the system to employ such a method will also have advantages in helping to minimize the overlap in the travel paths of two or more cartridge accessors 22, since the eligible subsystem 38 closest to all of the tape volumes is selected and thereby minimizes the cartridge accessor 22 motion.

Although the system uses weighing factors based on a linear relationship to proximity, it will be evident to those skilled in the art that alternative weighing schemes are available. For instance, the weighing factor may be an exponential relationship to proximity. It will also be evident that weighing factors could be adjustable, enabling dynamic real-time adjustment of the device pool ordering and selection in an automated storage library.

Accordingly, an automated storage library 16 for managing allocation of a peripheral data storage device in response to a multi-volume data set request has been described. While various embodiments have been disclosed, it should be apparent that many variations and alternative embodiments would be apparent to those skilled in the art in view of the teachings herein. It is understood, therefore, that the invention is not to be in any way limited except in accordance with the spirit of the appended claims and their equivalents.

We claim:

1. A method for allocating a peripheral data storage device (PDSD) when a collection of data volumes, defining a multi-volume data set, is requested in an automated storage library having a plurality of data volumes and a plurality of PDSDs, the method comprising:

assigning weighted scores to said PDSDs based on their physical proximity to data volumes of said collection of data volumes; and selecting a PDSD having a weighted score indicating closest proximity to said data volumes.

2. The method of claim 1, wherein assigning includes determining a physical proximity of an available PDSD with a data volume by comparing a location of said data volume and a location of said available PDSD.

3. The method of claim 2, wherein selecting includes selecting said PDSD from a list of eligible PDSDs ordered according to said weighted scores, said ordered list including available PDSDs.

4. The method of claim 3, wherein said PDSD is first in said ordered list.

5. The method of claim 1 where said PDSD is a tape drive.

6. The method of claim 1 where said PDSD is a disk drive.

7. An automated storage library, comprising:

a plurality of storage bins, each storage bin for storing a data storage medium, each data storage medium including at least one data volume;

a plurality of peripheral data storage devices (PDSDs), each PDSD capable of having a data volume mounted therein;

a picker for transferring a data storage medium between any PDSD and any storage bin; and machine executed means coupled for issuing commands to the picker to move a plurality of requested data volumes contained on said storage mediums from said storage bins to a selected PDSD of said PDSDs for mounting therein, where the requested data volumes belong to a multi-volume data set;

the machine executed means including means for determining said PDSD by:

assigning a weighted score to each said PDSD representing its physical proximity to each said requested data volume; and determining said selected PDSD as a PDSD having a weighted score indicating closet proximity to each said requested data volume.

8. The automated storage library of claim 7, wherein the machine-executed means for determining said selected PDSD includes means for determining a physical proximity of each PDSD with each requested data volume by comparing a location of each said requested data volume and a location of each available PDSD.

9. The automated storage library of claim 8, wherein the machine-executed means for determining said selected PDSD includes means for producing a list of eligible PDSDs ordered according to said weighted score, said ordered list including each available PDSD.

10. The automated storage library of claim 8, wherein said selected PDSD having the highest weighted score is first in said ordered list thereby indicating closest proximity of all available PDSDs to each requested data volume.

11. The automated storage library of claim 6, wherein said PDSD is a tape drive.

12. The automated storage library of claim 6, wherein said PDSD is a disk drive.

13. The library manager device of claim 12, including means for producing an ordered list of eligible PDSDs according to said assigned weighted score, said ordered list including each available PDSD.

14. The library manager device of claim 12, wherein a PDSD having the highest weighted score is first in said ordered list thereby indicating closest proximity of said PDSD to each said data volume.

15. The library manager device of claim 12, wherein said PDSD is a tape drive.

16. The library manager device of claim 12 wherein said PDSD is a disk drive.

17. A library manager device for allocating a peripheral data storage device (PDSD) from a plurality of PDSDs when data volumes, defining a multi-volume data set, are requested in an automated storage library, comprising:

discriminator means for determining physical proximity of a PDSD to each data volume in said multi-volume data set by comparing a location of each said data volume and each available PDSD;

means for assigning a weighted score to each said PDSD representing its physical proximity to each said data volume; and selection means for selecting a PDSD having a weighted score indicating having a closest proximity to each said data volume.

* * * * *

UNITED STATES PATENT AND TRADEMARK OFFICE
CERTIFICATE OF CORRECTION

PATENT NO.  : 6,298,439 B1
DATED       : October 2, 2001
INVENTOR(S) : T.W. Beglin It is certified that error appears in the above-identified patent and that said Letters Patent is hereby corrected as shown below:

Column 1,
Line 33, change "Modem computer" to -- Modern computer --.

Column 14,
Line 30, change "said PDSD" to -- said selected PDSD --.
Line 35, change "closet" to -- closest --.
Lines 56, 60 and 64, change "claim 12," to -- claim 13, --.
Line 56, renumber claim 13 as claim 14.
Line 60, renumber claim 14 as claim 15.
Line 64, renumber claim 15 as claim 16.
Line 66, renumber claim 16 as claim 17.
Line 66, change "claim 12" to -- claim 13, --.

Column 15,
Line 1, renumber claim 17 as claim 13.

Signed and Sealed this

Twenty-first Day of January, 2003

JAMES E. ROGAN
*Director of the United States Patent and Trademark Office*